(12) United States Patent
Fei et al.

(10) Patent No.: US 11,781,730 B2
(45) Date of Patent: Oct. 10, 2023

(54) LIGHTING UNIT AND LUMINAIRE

(71) Applicant: SIGNIFY HOLDING B.V., Eindhoven (NL)

(72) Inventors: Jia Fei, Shanghai (CN); Jiang Zhang, Shanghai (CN)

(73) Assignee: SIGNIFY HOLDING, B.V., Eindhoven (NL)

( * ) Notice: Subject to any disclaimer, the term of this patent is extended or adjusted under 35 U.S.C. 154(b) by 0 days.

(21) Appl. No.: 17/923,287

(22) PCT Filed: May 6, 2021

(86) PCT No.: PCT/EP2021/061950
§ 371 (c)(1),
(2) Date: Nov. 4, 2022

(87) PCT Pub. No.: WO2021/224370
PCT Pub. Date: Nov. 11, 2021

(65) Prior Publication Data
US 2023/0228399 A1    Jul. 20, 2023

(30) Foreign Application Priority Data

May 8, 2020  (WO) ............... PCT/CN2020/089276
Jun. 11, 2020  (EP) .................................. 20179442

(51) Int. Cl.
*F21V 5/00*       (2018.01)
*F21Y 105/16*   (2016.01)
*F21Y 115/10*   (2016.01)

(52) U.S. Cl.
CPC ........... *F21V 5/007* (2013.01); *F21Y 2105/16* (2016.08); *F21Y 2115/10* (2016.08)

(58) Field of Classification Search
CPC ..... F21V 5/007; G02B 19/006; G03B 3/0056; F21S 2/005; F21K 9/00
See application file for complete search history.

(56) References Cited

U.S. PATENT DOCUMENTS 8,999,770 B2   4/2015  Lin et al.
2010/0097780 A1   4/2010  Beatenbough et al.
(Continued)

FOREIGN PATENT DOCUMENTS

CN     103748407 A   4/2014
EP     2966346 A1    1/2016
(Continued)

*Primary Examiner* — Tracie Y Green
*Assistant Examiner* — Michael Chiang

(57) ABSTRACT

A lighting unit which comprises a lens arrangement over a LED module is provided. The lens arrangement comprises a plate having at least one lens integrally formed by the plate for positioning over a substrate of the LED module, and at least one magnifying component integrally formed by the plate. The LED module substrate has an inspection region which is inspected through the magnifying component, so as to enable determination of a spacing between the lens arrangement and the substrate by viewing an image of the marker arrangement created by the at least one magnifying component at a given viewing location. A luminaire is also provided, which luminaire comprises a housing and the lighting unit mounted within the housing, wherein the lens arrangement (10) forms the light output window of the luminaire.

13 Claims, 3 Drawing Sheets

(56) References Cited

U.S. PATENT DOCUMENTS

| | | | | |
|---|---|---|---|---|
| 2010/0207135 A1* | 8/2010 | Aketa | ............... | H01L 25/0753 |
| | | | | 257/E33.056 |
| 2013/0301264 A1* | 11/2013 | Van Gompel | ......... | F21V 17/005 |
| | | | | 362/236 |
| 2014/0192529 A1* | 7/2014 | Wilcox | ............... | F21V 29/763 |
| | | | | 362/244 |
| 2014/0268758 A1* | 9/2014 | Morgan | ............... | H05K 1/0209 |
| | | | | 362/237 |
| 2018/0187862 A1* | 7/2018 | Donato | ............... | G02B 3/0056 |

FOREIGN PATENT DOCUMENTS

| | | | |
|---|---|---|---|
| JP | 2009265423 | A | 11/2009 |
| JP | 2014503977 | A | 2/2014 |
| WO | 2012101547 | A1 | 8/2012 |
| WO | 2016124385 | A1 | 8/2016 |
| WO | 2017023442 | A1 | 2/2017 |

\* cited by examiner

LIGHTING UNIT AND LUMINAIRE

CROSS-REFERENCE TO PRIOR APPLICATIONS

This application is the U.S. National Phase application under 35 U.S.C. § 371 of International Application No. PCT/EP2021/061950, filed on May 6, 2021, which claims the benefit of European Patent Application 20179442.7, filed Jun. 11, 2020, which claims the benefit of Chinese International Patent Application No. PCT/CN2020/089276, filed on May 8, 2020. These applications are hereby incorporated by reference herein.

FIELD OF THE INVENTION

This invention relates to a lighting unit using a lens arrangement mounted over a LED module.

BACKGROUND OF THE INVENTION

Lenses or lens arrays are for example applied to LED modules in order to provide uniform illumination of a planar surface. Of course, many other beam shaping optics may be designed. The lenses are for example formed by an injection molded plate.

Lenses require particularly good quality and repeatability of their shape, and this becomes increasingly difficult with increasing size. However, it is desirable to form large lens plates in order to simplify the optical architecture and improve the optical efficiency. Thus, it is desirable to replace individual small lens plates with one larger lens plate arrangement. A large lens plate arrangement may be clipped onto an LED module during assembly.

The lens plate should be flat and should be attached to the LED module (e.g. to a PCB of the LED module) to ensure the right distance between LED module and the inner (facing) surface of the lens for good light control.

However, a large lens plate is not always flat, and may not be attached correctly to the LED module after assembly. For example, clips may not be pushed into the right position or lens plate deformation during assembly can cause vertical gaps between the LED module and the lens plate.

The alignment of the lenses of the lens plate (both vertical and lateral) with the corresponding underlying LED within a lighting unit is critical to the optical performance of the module. If there is misalignment between the lenses and the LEDs, the problem is typically detected based on optical verification of the function of the lighting unit. In particular, an incorrect light distribution will be detected.

When this incorrect light distribution is detected there are the following possible causes:
(i) The vertical distance between the lens and the LED is not correct;
(ii) The center of the lens is not aligned well with the center of the LED in the horizontal plane (generally called the x-y plane);
(iii) The upper and lower surfaces of the lens are misaligned;
(iv) The surface accuracy of the lens is out of tolerance.

The optical investigation to identify these possible faults takes time, and it requires the module to be complete so that it can be operated to deliver a light output through the lens.

The applicant has proposed measures to enable identification of horizontal plane misalignment issues and lens surface misalignment issues, in PCT/CN2019/118068 filed 13 Nov. 2019.

This invention relates in particular to the detection of vertical alignment issues. It would be desirable to be able to identify these vertical alignment issues, resulting in incorrect light distribution, at an earlier stage, and without requiring analysis of the optical output of the module.

SUMMARY OF THE INVENTION

According to examples in accordance with an aspect of the invention, there is provided a lighting unit, comprising: a LED module and a lens arrangement provided over the LED module, wherein
  the LED module comprising:
    a substrate;
    at least one LED formed on the substrate; and
    a visual inspection region formed on the substrate, the visual inspection region comprising a marker arrangement;
  the lens arrangement comprising:
    a plate having at least one lens integrally formed by the plate; and
    at least one magnifying component integrally formed by the plate;
  wherein the or each lens is positioned over a respective LED or sub-array of LEDs, and the at least one magnifying component is positioned over the marker arrangement, so as to enable determination of a spacing between the lens arrangement and the substrate by viewing an image of the marker arrangement created by the at least one magnifying component at a given viewing location.

By enabling inspection of an inspection region through a magnifying component, the spacing between the magnifying component and the substrate beneath determines the amount of the inspection region that is visible through the magnifying component. By providing a suitable pattern at the inspection region, the portion of the pattern that is visible provides information about the spacing.

The plate preferably comprises an injection molded component. The inspection approach implemented by the invention enables the correct plate positioning to be determined by a simple visual inspection, so that the quality of an assembly using a low cost large area injection molded lens plate may be tested.

The lens arrangement for example comprises an array of lenses, wherein the at least one magnifying component is at a position between the lenses of the array. The magnifying component thus does not take up any of the optically functional area of the lens plate.

Each of the at least one magnifying component (16) may have a focus point. The image created by the magnifying component at a given viewing location depends on the position of the inspection region relative to the focal point of the magnifying component.

The plate for example comprises an upper surface and a lower surface, and wherein the lenses of the array have an upper surface formed by the upper surface of the plate and a lower surface formed by the lower surface of the plate.

The lens shape is thus defined by the upper and lower surfaces of the plate.

The magnifying component for example comprises a bump formed on the upper surface. The lower surface beneath the magnifying component may be flat, but it is also possible for the magnifying component to have shaped upper and lower surfaces. The magnifying component may comprise a circular lens, which is smaller than the lens or each of the lenses of the array.

The LED module for example comprises an array of LEDs. One LED or a sub-array of LEDs may be positioned beneath a respective lens of the lens array. The lenses provide beam shaping of the LED light output.

The substrate for example comprises a PCB.

The marker arrangement for example comprises a set of concentric rings, wherein the spacing between the marker arrangement and the magnifying component determines which rings are visible.

Thus, by inspecting the inspection region and identifying which rings are visible, the spacing can be determined. There may be two levels of determination so that the spacing is determined to be correct or incorrect. However, there may be three or more levels of determination, for example so that gradual deterioration of the quality of the vertical alignment can be monitored.

The rings of the set for example have different colors. This enables rapid determination of the spacing information.

Alternatively, the marker arrangement may comprise other kind(s) of pattern.

The invention also provides a luminaire comprising:

a housing; and the lighting unit defined above mounted within the housing, wherein the lens arrangement forms the light output window of the luminaire.

The invention also provides a method of visually inspecting the spacing between a lens arrangement and a LED module beneath the lens arrangement, comprising:

viewing a marker arrangement formed at an inspection region of a substrate of the LED module through a magnifying component which is integrally formed with the lens arrangement, thereby to enable determination of a spacing between the lens arrangement (10) and the substrate.

The method may comprise determining how many of a set of concentric rings of the marker arrangement are visible, wherein the spacing between the marker arrangement and the magnifying component determines which concentric rings are visible.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
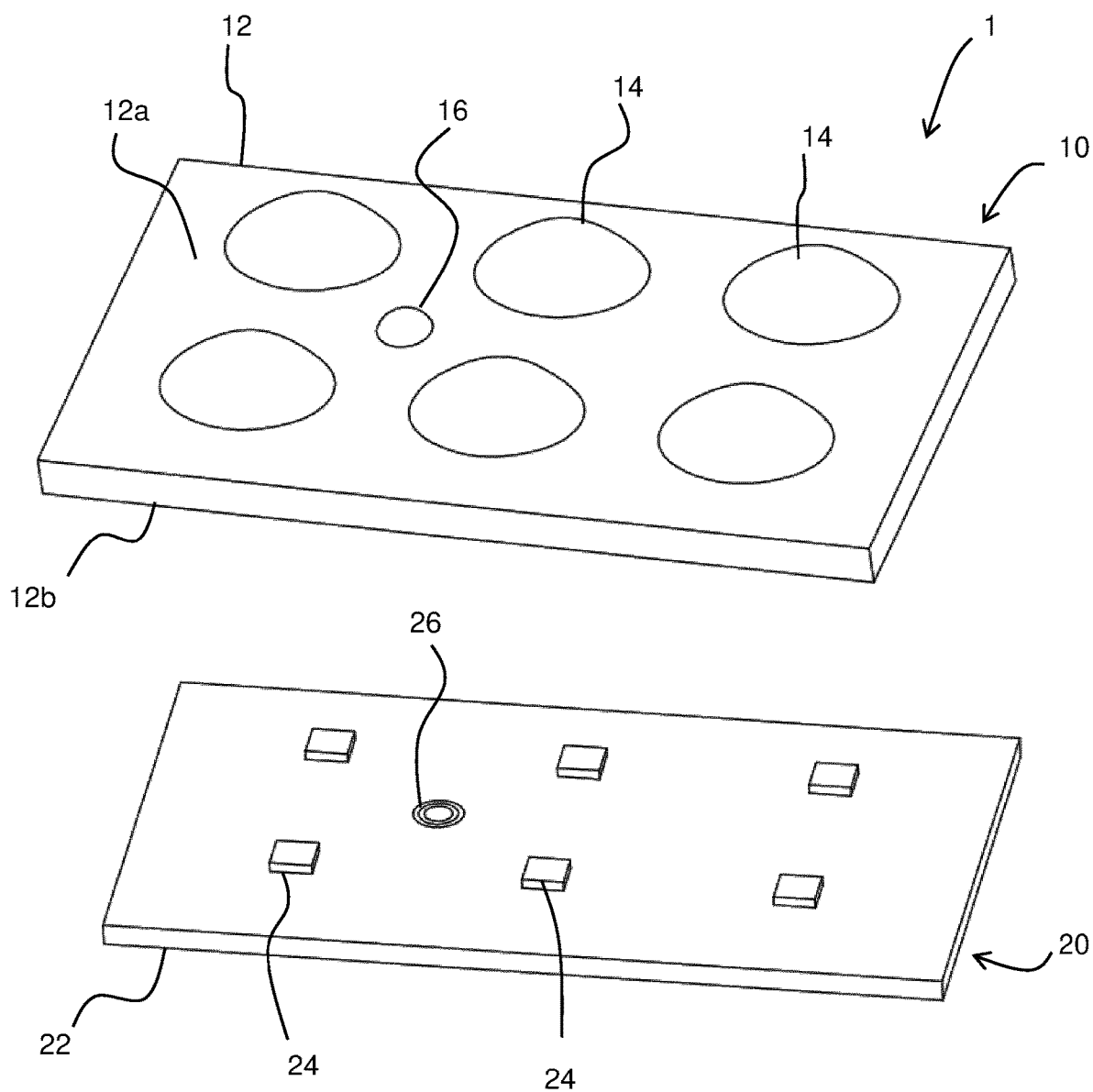
FIG. 1 shows in exploded form a lighting unit comprising a lens arrangement provided over a LED module.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a lens arrangement, a LED module and a lighting unit which comprises the lens arrangement over the LED module. The lens arrangement comprises a plate having at least one lens integrally formed by the plate for positioning over a substrate of the LED module, and at least one magnifying component integrally formed by the plate. The LED module substrate has an inspection region which is inspected through the magnifying component, thereby to enable determination of a spacing between the lens arrangement and the substrate.

FIG. 1 shows in exploded form a lighting unit 1 comprising a lens arrangement 10 provided over a LED module 20.

The lens arrangement 10 comprises a plate 12 having an upper surface 12a and a lower surface 12b. An array of lenses 14 is defined, each lens having an upper surface formed by the upper surface of the plate and a lower surface (not shown) formed by the lower surface of the plate. The plate is preferably injection molded.

The LED module 20 comprises a substrate 22 in the form of a printed circuit board, PCB, and array of LEDs 24.

Each lens 14 of the lens array is positioned over a respective LED 24 or sub-array of LEDs. The lenses 14 for example are intended to provide a planar surface illumination by delivering a so-called batwing intensity distribution (also referred to as a wide beam intensity distribution). The term batwing refers to a highly peaked shape of the intensity distribution in a polar plot. The batwing light distribution allows for a uniform illumination of a planar surface for example even up to a 140° beam angle. Such light distributions and hence lens designs are used for example in street lighting and wall washer applications. In these examples, the batwing distribution targets a planar surface in the far field: the illuminated surface is positioned at a distance much larger than the light module dimensions.

The invention may however be applied to any lens type.

To the extent described above, the lighting unit design is conventional.

In accordance with the invention, the lens arrangement comprises a magnifying component 16 integrally formed by the plate 12 of the lens array. The magnifying component 16 is for visual inspection of an inspection region 26 of the PCB 22. In this way, the spacing between the lens arrangement 10 and the PCB can be assessed.

The amount of the inspection region 26 that is visible through the magnifying component depends on the spacing between the magnifying component and the PCB. This is because the image created by the magnifying component at a given viewing location depends on the position of the PCB relative to a focal point of the magnifying component.

The inspection region 26 has a pattern, such that a portion of the pattern is visible depending on the spacing between the magnifying component and the PCB 22.

There may be one or multiple inspection areas, for example to enable assessment of the uniformity of the spacing across a large area. For simplicity, only a single magnifying component and corresponding inspection region is shown.

The magnifying component 16 is at a position between the lenses 14 of the array. In this way, the magnifying component 16 does not take up any area of the lens plate which is used for beam shaping o the LED output light. The magnifying component 16 for example comprises a bump formed on the upper surface 12a. The lower surface 12b beneath the magnifying component may be flat, but it is also possible for the magnifying component to have shaped upper and lower surfaces to define a desired optical (i.e. lens) function. The magnifying component for example comprises a circular lens, which is smaller than the lenses of the array so that it can fit in the spaces between the lenses of an array.

Figure 2:
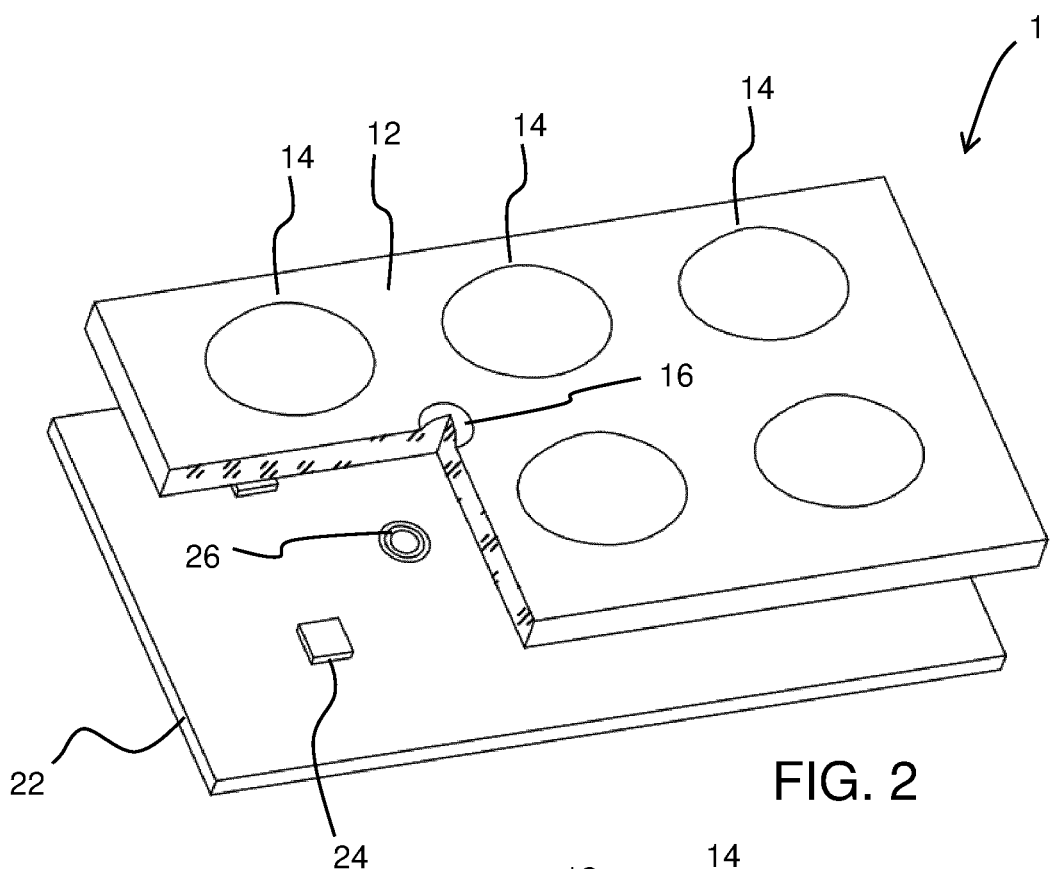
FIG. 2 shows the lens arrangement positioned aligned with the LED module, with the lens arrangement having a cut-away portion.

FIG. 2 shows the lens arrangement 10 positioned aligned with the LED module 20, with the lens arrangement having a cut-away portion to show the magnifying component 16 with a flat base and domed top.

Figure 3:
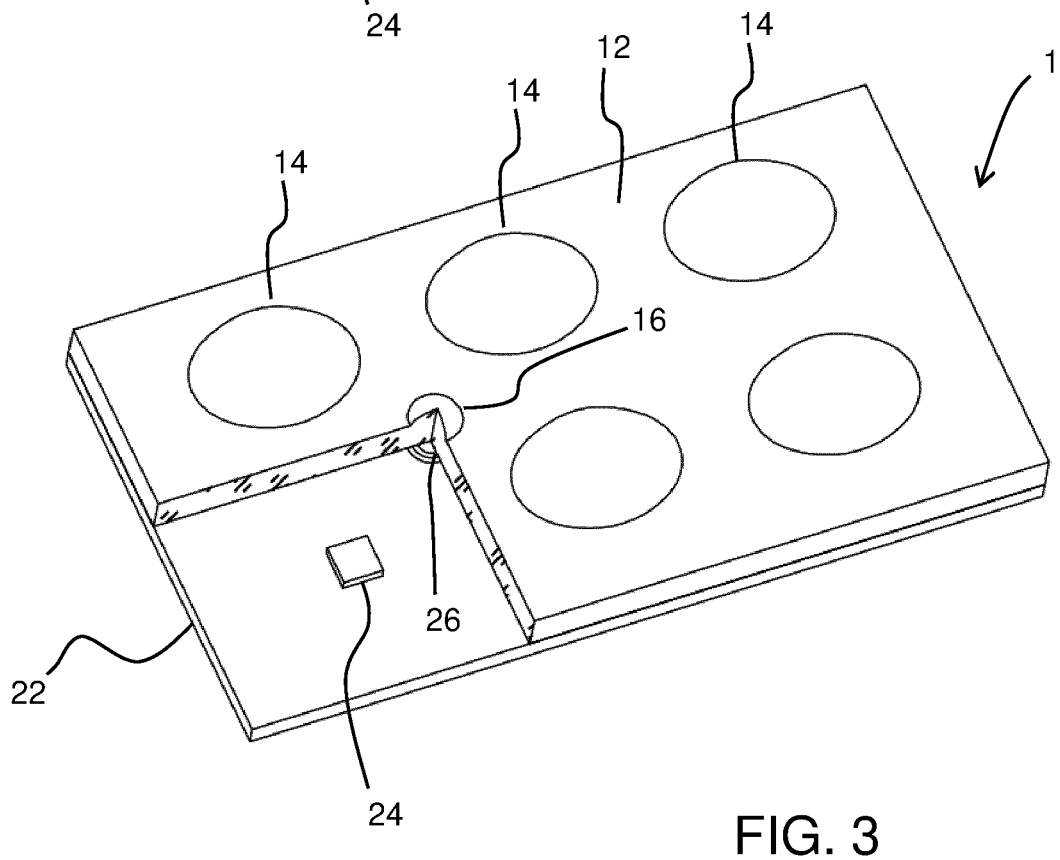
FIG. 3 shows the lens arrangement clipped to the LED module.

FIG. 3 shows the lens arrangement 10 clipped to the LED module 20, again with the lens arrangement having a cut-away portion. The lens arrangement for example has clips (not shown) which attach to the outer periphery of the PCB. When used in a luminaire, the lighting unit is mounted within a housing and the lens arrangement 10 forms the light output window of the luminaire.

It may be intended for the upper surface of the PCB to contact the lower surface of the lens plate. In such a case, the LEDs 14 may be positioned in a recess formed by the shaped lower surface of the lenses 14. The spacing may be too great if the lens arrangement is not clipped correctly into place, or it may be too great near the middle of the lens plate if the lens plate has a non-flat shape and is then raised in the middle.

Alternatively, it may be intended for the lens plate to be spaced over the PCB, including a spacing at the edges defined the clip arrangement. In such a case, the spacing may be too great or too small if the lens plate has a non-flat shape and is then raised or sunken in the middle.

The visual inspection region 26 comprises a marker arrangement such as set of concentric rings.

Figure 4:
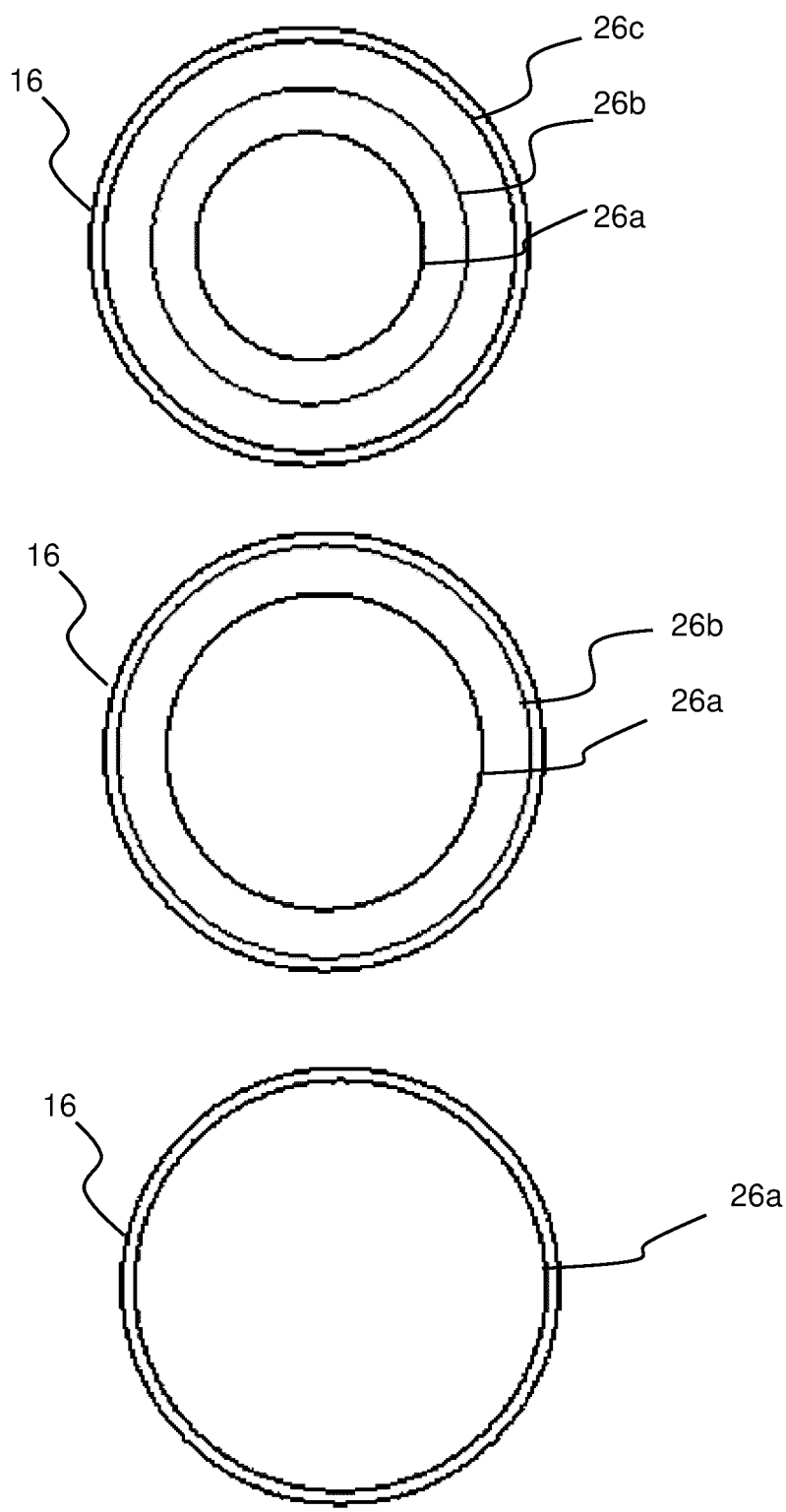
FIG. 4 shows a view through the magnifying component of a set of three concentric rings for different levels of spacing between the lens arrangement and LED module.

FIG. 4 shows a view through the magnifying component 16 of a set of three concentric rings 26a, 26b, 26c. The marker arrangement for example comprises silk-screen printed circles of different colors on the upper surface of the PCB.

By way of example, the inner ring 26a may be red, the middle ring 26b may be yellow and the outer ring 26c may be green. Depending on the spacing between the PCB and the lens plate, a different number of the circles can be seen through the magnifying component bump so that the gap between PCB and lens plate can be interpreted based on circles which are visible.

The top image shows that all three circles are visible, including the outermost (green) circle 26c. This indicates that there is almost no gap, so the sample is perfect.

The middle image shows that only the middle (yellow) circle 26b and the inner (red) circle 26a are visible. This indicates that there is a gap but it has an acceptable dimension.

The bottom image shows that only the inner (red) circle 26a is visible. This indicates that there is a large gap that fails a quality control test.

Thus, by inspecting the inspection region and identifying which rings are visible, the spacing and hence the product quality can be determined. There may be more than the three levels of assessment as explained above, or there may be only two.

The invention also provides the method of visually inspecting the spacing between the lens arrangement 10 and the LED module 20 based on viewing the marker arrangement through the magnifying component 16.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to".

Any reference signs in the claims should not be construed as limiting the scope.

The invention claimed is:

1. A lighting unit, comprising:
a LED module; and
a lens arrangement provided over the LED module, wherein
the LED module comprising:
  a substrate;
  at least one LED formed on the substrate; and
  a visual inspection region formed on the substrate, the visual inspection region comprising a marker arrangement;
the lens arrangement comprising:
  a plate having at least one lens integrally formed by the plate; and
  at least one magnifying component integrally formed by the plate;
wherein the or each lens is positioned over a respective LED or sub-array of LEDs, and the at least one magnifying component is positioned over the marker arrangement; so as to enable determination of a spacing between the lens arrangement and the substrate by viewing an image of the marker arrangement created by the at least one magnifying component at a given viewing location, wherein the marker arrangement provides information about the spacing.

2. The lighting unit of claim 1, wherein the plate comprises an injection molded component.

3. The lighting unit of claim 1, comprising an array of lenses, wherein the at least one magnifying component is at a position between the lenses of the array.

4. The lighting unit of claim 3, wherein the plate comprises an upper surface and a lower surface, and wherein the lenses of the array have an upper surface formed by the upper surface of the plate and a lower surface formed by the lower surface of the plate.

5. The lighting unit of claim 4, wherein the magnifying component comprises a bump formed on the upper surface.

6. The lighting unit of claim 5, wherein the magnifying component comprises a circular lens, which is smaller than the lens or each of the lenses of the array.

7. The lighting unit of claim 1, wherein each of the at least one magnifying component has a focus point.

8. The lighting unit of claim 1, wherein the LED module comprises an array of LEDs.

9. The lighting unit of claim 8, wherein the substrate comprises a PCB.

10. The lighting unit of claim 8, wherein the marker arrangement comprises a set of concentric rings, wherein the spacing between the marker arrangement and the magnifying component determines which rings are visible.

11. The lighting unit of claim 10, wherein the rings of the set have different colors.

12. The lighting unit of claim 8, wherein the marker arrangement comprises a pattern.

13. A luminaire comprising:
a housing; and
the lighting unit of claim 1 mounted within the housing, wherein the lens arrangement forms the light output window of the luminaire.

* * * * *